United States Patent
Bong

(10) Patent No.: US 8,917,158 B2
(45) Date of Patent: *Dec. 23, 2014

(54) MOBILE TERMINAL AND METHOD OF CONTROLLING THE SAME

(75) Inventor: Byungeun Bong, Seoul (KR)

(73) Assignee: LG Electronics Inc., Seoul (KR)

( * ) Notice: Subject to any disclaimer, the term of this patent is extended or adjusted under 35 U.S.C. 154(b) by 745 days.

This patent is subject to a terminal disclaimer.

(21) Appl. No.: 13/087,918

(22) Filed: Apr. 15, 2011

(65) Prior Publication Data

US 2011/0273267 A1 Nov. 10, 2011

(30) Foreign Application Priority Data

May 6, 2010 (KR) .................. 10-2010-0042616

(51) Int. Cl.

| G05B 21/00 | (2006.01) |
|---|---|
| G06K 9/00 | (2006.01) |
| G06F 21/00 | (2013.01) |
| H04M 1/00 | (2006.01) |
| G06F 3/041 | (2006.01) |
| G06F 3/042 | (2006.01) |
| G06F 3/0485 | (2013.01) |
| G06F 3/01 | (2006.01) |
| G06F 3/0488 | (2013.01) |
| G06F 3/023 | (2006.01) |

(52) U.S. Cl.
CPC ............... *G06F 3/016* (2013.01); *G06F 3/042* (2013.01); *G06F 2203/04106* (2013.01); *G06F 3/0485* (2013.01); *G06F 3/04883* (2013.01); *G06F 3/0233* (2013.01)
USPC ......... 340/5.53; 340/5.83; 382/124; 382/125; 382/155; 713/182; 455/565; 345/156; 345/173

(58) Field of Classification Search
USPC .......... 340/10.1, 572.1, 568.1, 5.53; 382/124, 382/107, 312; 345/174, 173, 156; 713/202, 713/186
See application file for complete search history.

(56) References Cited

U.S. PATENT DOCUMENTS

| 5,764,222 | A * | 6/1998 | Shieh ............................ 345/173 |
|---|---|---|---|
| 6,408,087 | B1 * | 6/2002 | Kramer ......................... 382/124 |
| 7,280,677 | B2 * | 10/2007 | Chandler et al. .............. 382/116 |
| 7,420,546 | B2 * | 9/2008 | Abdallah et al. .............. 345/173 |
| 8,443,199 | B2 * | 5/2013 | Kim et al. ...................... 713/182 |
| 8,514,183 | B2 * | 8/2013 | Westerman et al. .......... 345/173 |
| 2002/0005837 | A1 * | 1/2002 | Thomason et al. ............ 345/169 |
| 2004/0037016 | A1 * | 2/2004 | Kaneko et al. .................... 361/1 |
| 2004/0098389 | A1 * | 5/2004 | Jones et al. ........................ 707/6 |
| 2004/0100362 | A1 * | 5/2004 | Mohamed et al. ............ 340/5.82 |
| 2005/0169503 | A1 * | 8/2005 | Howell et al. ................. 382/115 |
| 2006/0285729 | A1 * | 12/2006 | Kim et al. ...................... 382/124 |
| 2010/0231356 | A1 * | 9/2010 | Kim ............................... 340/5.83 |
| 2011/0037707 | A1 * | 2/2011 | Radivojevic et al. ......... 345/173 |

* cited by examiner

*Primary Examiner* — Fekadeselassie Girma
(74) *Attorney, Agent, or Firm* — Birch, Stewart, Kolasch & Birch, LLP

(57) ABSTRACT

A mobile terminal and a method of controlling the mobile terminal are provided. The method includes displaying an operation screen on a display module; receiving a fingerprint-touch input through a user input unit capable of identifying a fingerprint; and if fingerprint information of the received fingerprint-touch input matches any one of a plurality of pieces of previously-stored fingerprint information, displaying a character corresponding to the combination of a location of the detection of the received fingerprint-touch input and the previously-stored fingerprint information that matches the fingerprint information of the received fingerprint-touch input on the operation screen. Therefore, it is possible to enter different characters or symbols by generating different fingerprint-touch inputs using different fingers.

20 Claims, 14 Drawing Sheets

| | R1 | R2 | R3 | ... | Rn |
|---|---|---|---|---|---|
| Red | 100% | 50% | 20% | · | · |
| Green | 50% | 20% | · | · | · |
| Blue | 0% | 10% | 0% | · | ·· |

(a)          (b)

MOBILE TERMINAL AND METHOD OF CONTROLLING THE SAME

CROSS-REFERENCE TO RELATED APPLICATION

This application claims the priority benefit of Korean Patent Application No. 10-2010-0042616, filed on May 6, 2010 in the Korean Intellectual Property Office, the disclosure of which is incorporated herein by reference.

BACKGROUND OF THE INVENTION

1. Field of the Invention

The present invention relates to a mobile terminal and a method of controlling the same, and more particularly, to a mobile terminal and a method of controlling the same, in which various operations performed by the mobile terminal can be effectively controlled in response to a fingerprint-touch input including fingerprint information.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for a UI such as a display or a keypad without compromising the mobility and the portability of the mobile terminal. Therefore, it is necessary to develop ways to control the operation of a mobile terminal using a new data input method, other than an existing menu-based method, and thus efficiently use various functions provided by the mobile terminal.

SUMMARY OF THE INVENTION

The present invention provides a mobile terminal and a method of controlling the mobile terminal, in which various operations performed by the mobile terminal can be effectively controlled in response to a fingerprint-touch input including fingerprint information.

According to an aspect of the present invention, there is provided a method of controlling a mobile terminal, the method including displaying an operation screen on a display module; receiving a fingerprint-touch input through a user input unit capable of identifying a fingerprint; and if fingerprint information of the received fingerprint-touch input matches any one of a plurality of pieces of previously-stored fingerprint information, displaying a character corresponding to the combination of a location of the detection of the received fingerprint-touch input and the previously-stored fingerprint information that matches the fingerprint information of the received fingerprint-touch input on the operation screen.

According to another aspect of the present invention, there is provided a mobile terminal including a display module configured to display an operation screen thereon; a user input unit configured to be capable of identifying a fingerprint; a memory configured to store a plurality of pieces of fingerprint information therein; and a controller configured to receive a fingerprint-touch input through the user input unit, wherein, if fingerprint information of the received fingerprint-touch input matches any one of the plurality of pieces of fingerprint information present in the memory, the controller is configured to displaying a character corresponding to the combination of a location of the detection of the received fingerprint-touch input and the fingerprint information that matches the fingerprint information of the received fingerprint-touch input on the operation screen.

According to another aspect of the present invention, there is provided a method of controlling a mobile terminal, the method including displaying an operation screen including an indicator region, in which a number of indicators can be displayed, on a display module capable of identifying a fingerprint; detecting a fingerprint-touch input from the indicator region; and if fingerprint information of the detected fingerprint-touch input matches any one of a plurality of pieces of previously-stored fingerprint information, displaying one of a plurality of groups of indicators corresponding to the previously-stored fingerprint information that matches the fingerprint information of the detected fingerprint-touch input in a display area on the operation screen.

According to another aspect of the present invention, there is provided a mobile terminal including a display module configured to be capable of identifying a fingerprint and display an operation screen including an indicator region, in which a number of indicators can be displayed, thereon; a memory configured to store a plurality of pieces of fingerprint information therein; and a controller configured to detect a fingerprint-touch input from the indicator region, wherein, if fingerprint information of the detected fingerprint-touch input matches any one of a plurality of pieces of previously-stored fingerprint information, the controller is configured to display one of a plurality of groups of indicators corresponding to the previously-stored fingerprint information that matches the fingerprint information of the detected fingerprint-touch input in a display area on the operation screen.

BRIEF DESCRIPTION OF THE DRAWINGS

The above and other features and advantages of the present invention will become more apparent by describing in detail preferred embodiments thereof with reference to the attached drawings in which:

Figure 9:
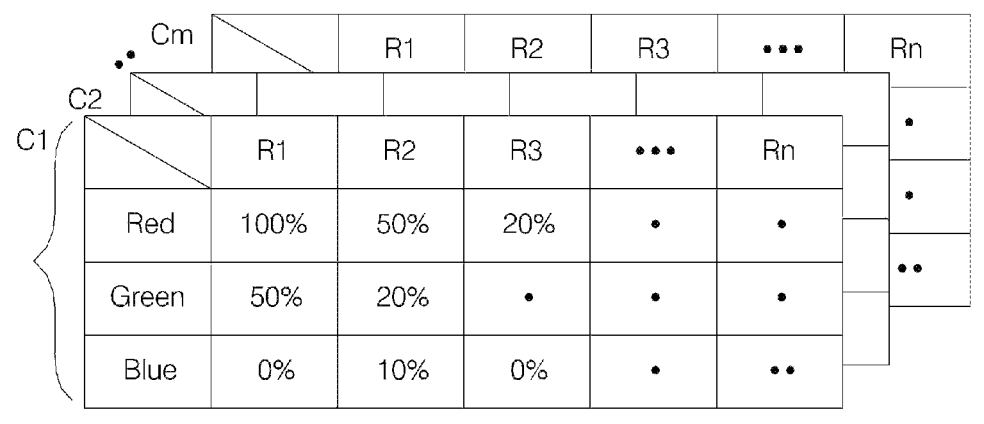

FIGS. 5 through 9 illustrate diagrams for explaining the structure of a display module of a mobile terminal capable of identifying a fingerprint;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
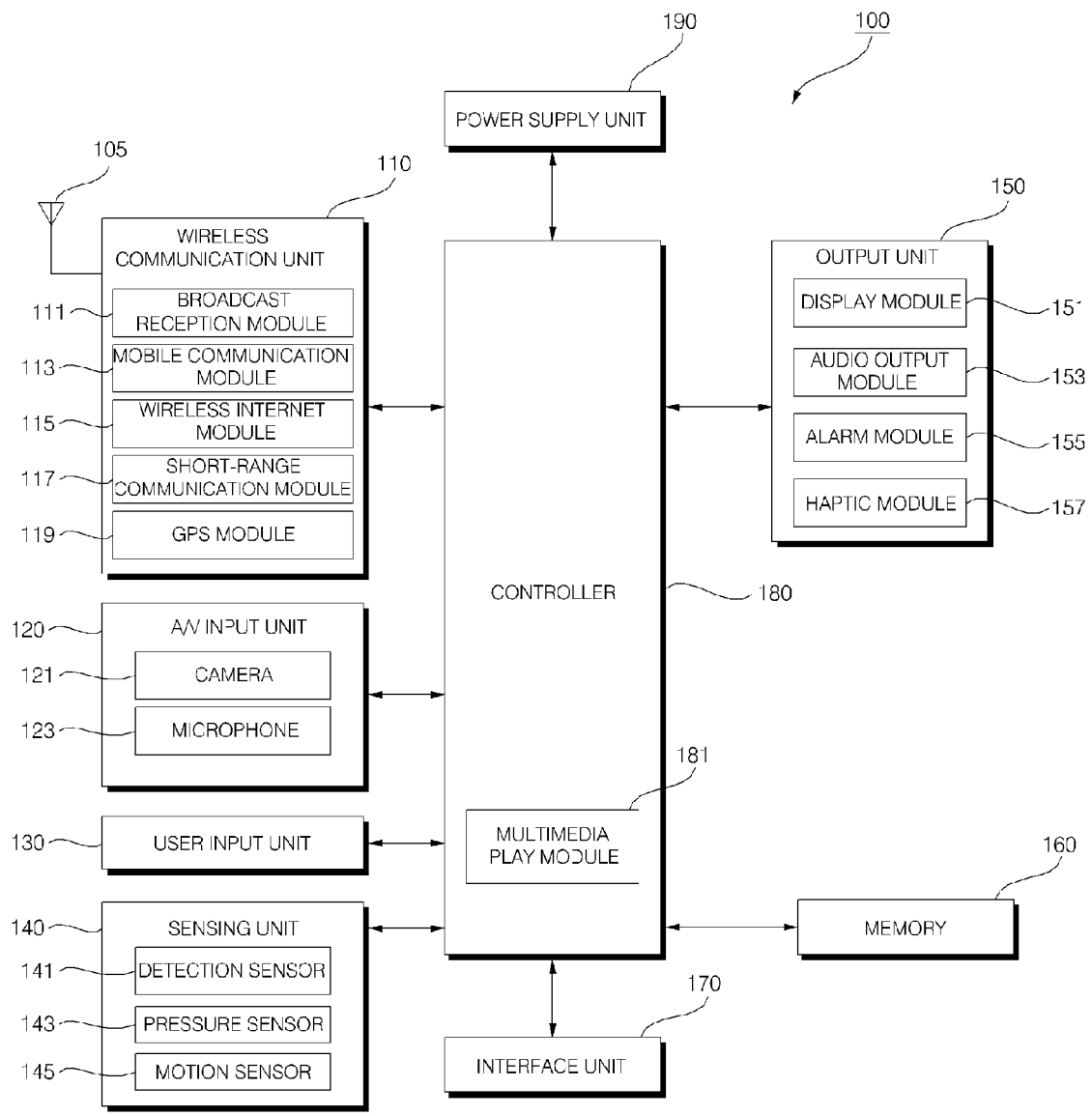
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for alerting the user to the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a slider-type mobile terminal equipped with a user input unit capable of receiving a typical touch input or a fingerprint-touch input. However, the present invention is not restricted to a slider-type mobile terminal. Rather, the present invention can be applied to various mobile phones, other than a slider-type mobile terminal.

Figure 2:
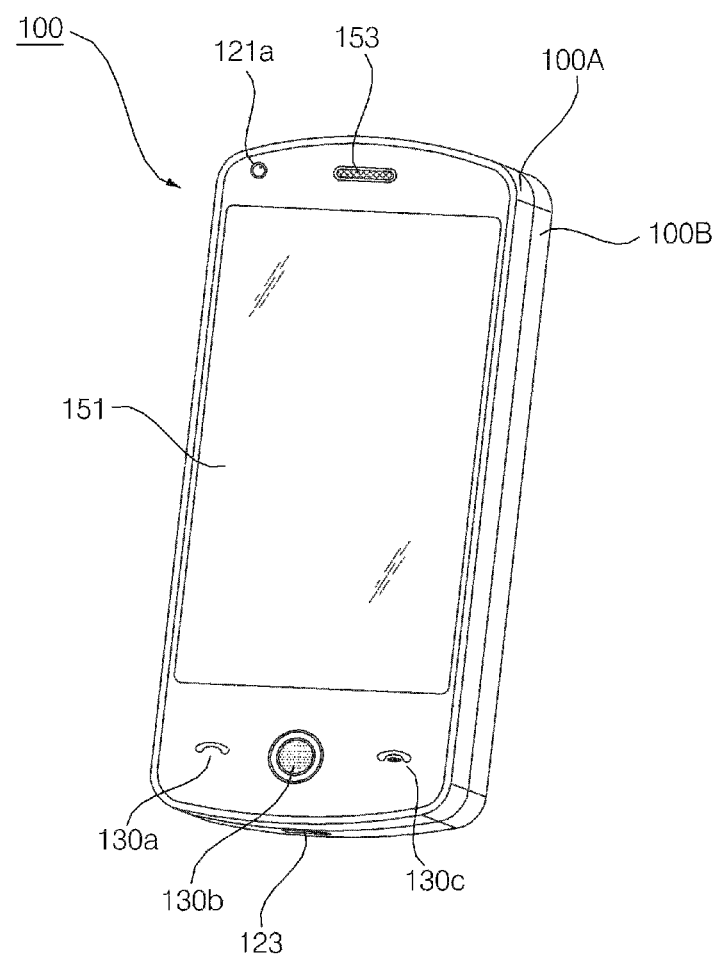
FIGS. 2 and 3 illustrate front perspective views of the mobile terminal shown in FIG. 1.
Figure 3:
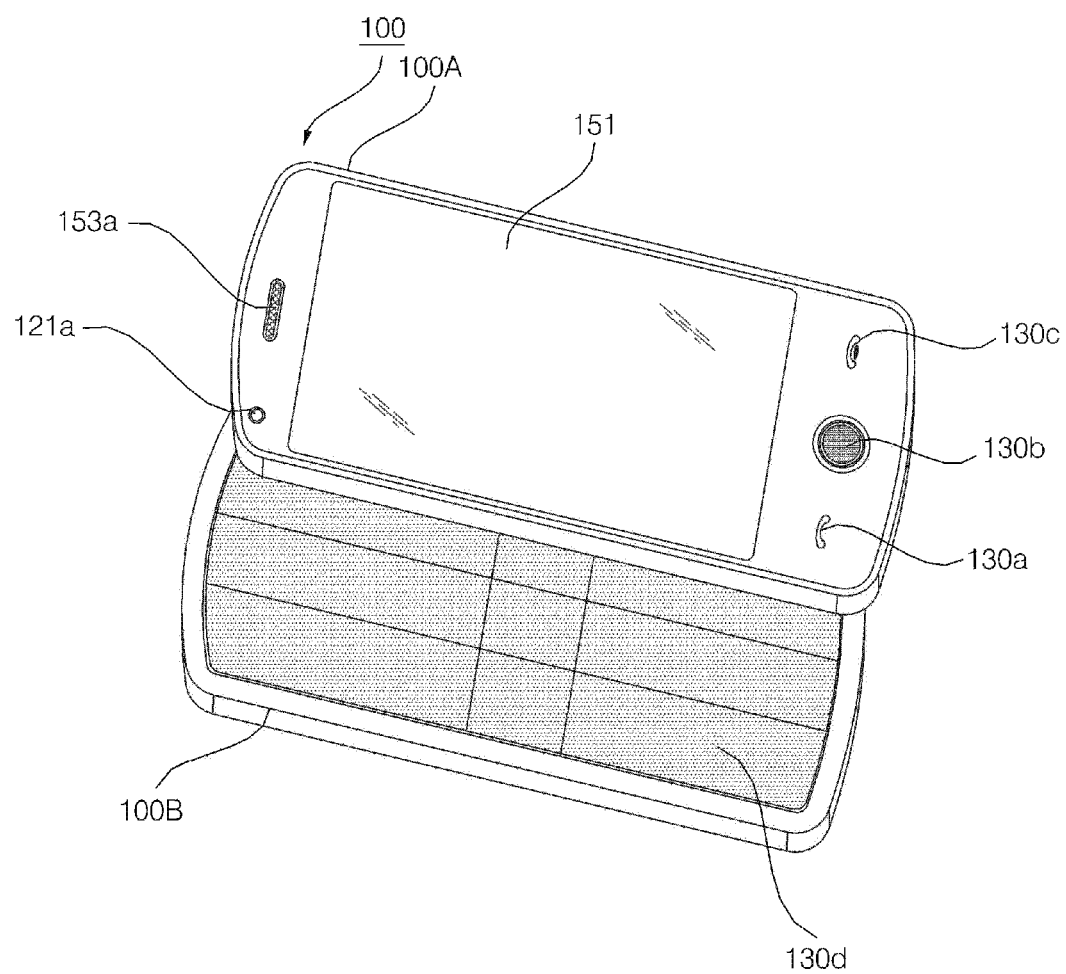
Figure 4:
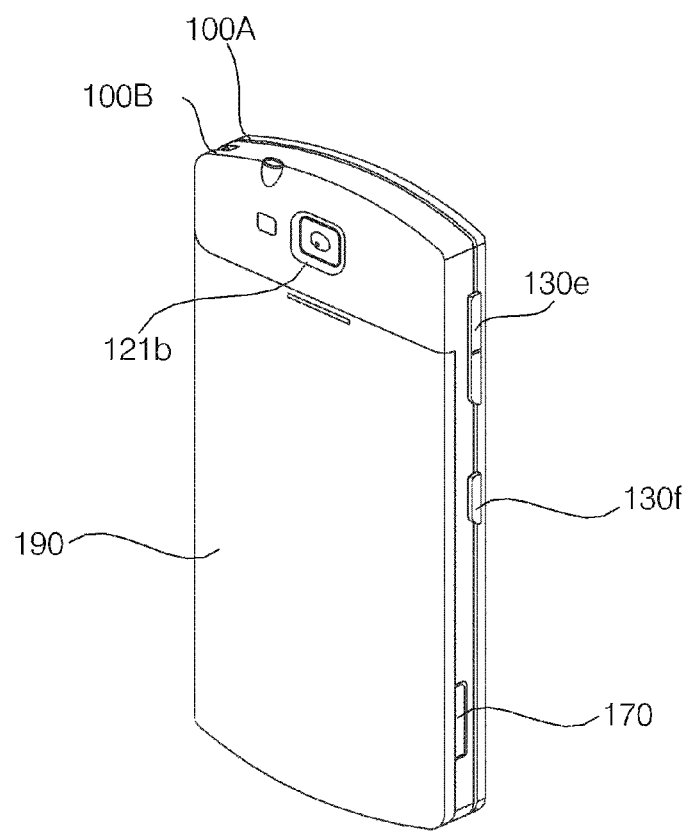
FIG. 4 illustrates a rear perspective view of the mobile terminal shown in FIG. 2.
Figure 5:
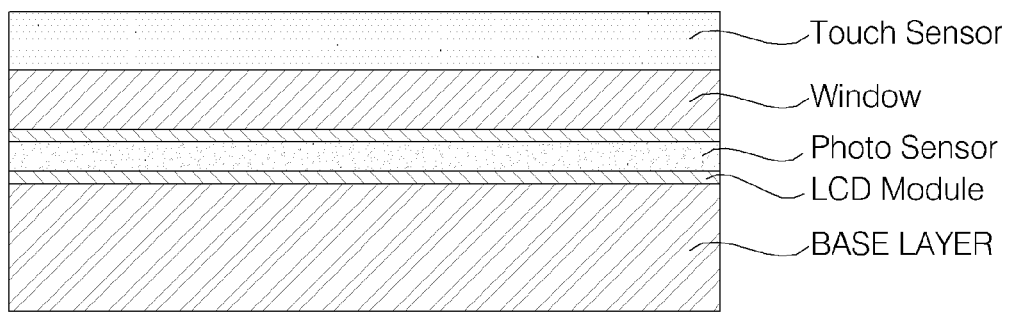
Figure 5:
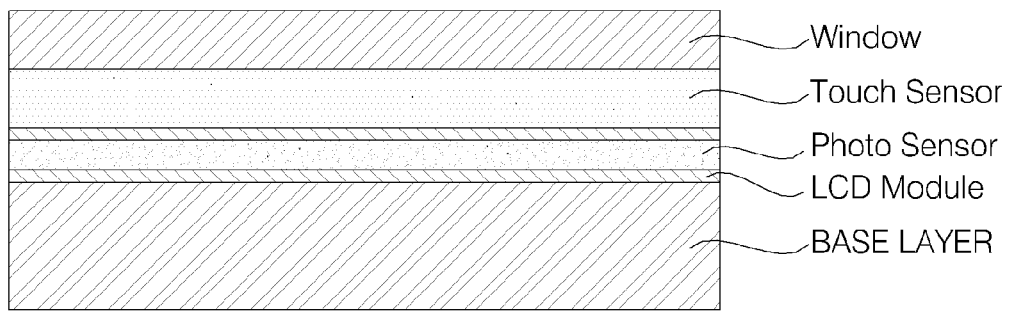

FIGS. 2 and 3 illustrate front perspective views of the mobile terminal 100, and FIG. 4 illustrates a rear perspective view of the mobile terminal 100. Referring to FIGS. 2 and 3, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

Cases that form the exterior of the mobile terminal 100 including the first and second bodies 100A and 100B may be formed of a synthetic resin through injection molding. Alternatively, the cases may be formed of a metal such as stainless steel (STS) or titanium (Ti).

The display module 151, the audio output module 153, a first camera 121a and first through third user input modules 130a through 130c may be disposed on the first body 100A. A fourth user input module 130d and the microphone 123 may be disposed on the second body 100B.

A touch pad may be overlaid on the display module 151 in a layered manner to allow the display module 151 to operate as a touch screen, and thus, the user can input information or commands by touching the display module 151. The audio output module 153 may be implemented in the form of a receiver or speaker. The first camera 121a may be configured to be suitable for taking a self-shot or video of the user. The microphone 123 may be configured to properly receive the user's voice or other sounds.

The first through fourth user input modules 130a through 130d and fifth and sixth user input modules 130e and 130f may be collectively referred to as the user input unit 130, and any means can be employed as the first through sixth user input modules 130a through 130f so long as it can operate in a tactile manner.

For example, the user input unit 130 may be implemented as a dome switch or a touch pad that can receive a command or information according to a pressing or a touch operation by the user, or may be implemented as a wheel or jog type for rotating a key or as a joystick.

In terms of function, the first through third user input modules 130a through 130c may operate as function keys for making a call, moving a mouse pointer, or entering a command such as start, end, or scroll, the fourth user input module 130d, which is disposed on the second body 100B, may operate as, for example, a QWERTY fingerprint-touch keypad, the fifth user input module 130e may operate as a function key for selecting an operating mode for the mobile terminal 100, and the sixth user input module 130f may operate as a hot key for activating a special function within the mobile terminal 100

FIG. 4 illustrates a rear perspective view of the mobile terminal 100. Referring to FIG. 4, a second camera 121b may be additionally mounted on the rear surface of the second body 100B, and the fifth and sixth user input modules 130e and 130f and the interface unit 170 may be disposed on one side of the first or second body 100A or 100B.

The second camera 121b may have an image capture direction which is substantially the opposite to that of the first camera 121a, and may have a different resolution from that of the first camera 121a.

A flash and a mirror may be disposed to be adjacent to the second camera 121b. When an image of a subject is captured with the second camera 121b, the flash may illuminate the subject. The mirror may allow the user to see him- or herself when he or she wants to capture his or her own image by using the second camera 121b.

Another audio output module (not shown) may be additionally provided on the second body 100B. The audio output module on the second body 100B may realize a stereo function along with the audio output module 153 on the first body 100A. The audio output module on the second body 100B may also be used in a speaker-phone mode.

The interface unit 170 may used as a passage allowing the mobile terminal 100 to exchange data with an external device either through a fixed line or wirelessly.

A broadcast signal reception antenna may be disposed at one side of the first or second body 100A or 100B, in addition to an antenna used for call communication. The broadcast signal reception antenna may be installed such that it can be extended from the first or second body 100A or 100B.

The power supply unit 190 may be mounted on the second body 100B and may supply power to the mobile terminal 100. The power supply unit 190 may be, for example, a chargeable battery which can be detachably combined to the second body 100B for being charged.

The second camera 121b and the other elements that have been described as being provided on the second body 100B may be provided on the first body 100A. In addition, the first camera 121a may be configured to be rotatable and thus to allow image capturing in various directions. In this case, the second camera 121b may be optional.

FIGS. 5 through 9 illustrate the structure of the display module 151 or the user input unit 130, which is capable of identifying a fingerprint. A touch input made by placing a pointer, such as a pen in contact with the surface of the display module 151, will hereinafter be referred to as an ordinary touch input, and a touch input made by placing the user's finger in contact with the surface of the display module 151 so as to provide fingerprint information will hereinafter be referred to as a fingerprint-touch input.

In order to generate a fingerprint-touch input, the display module 151 may need to be configured to be able to identify a fingerprint. For this, the display module 151 may include an LCD module with a photo sensor embedded therein or an LCD module covered with a scan film with a photo sensor.

Referring to FIGS. 5(a) and 5(b), the display module 151 may include an LCD module having a photo sensor embedded therein. A touch sensor may be disposed on the top or bottom of a window. More specifically, the display module 151 may include a stack of a base layer, an LCD module, a photo sensor, a window, and a touch sensor, as shown in FIG. 5(a), or may include a stack of the base layer, the LCD module, the photo sensor, the touch sensor and the window, as shown in FIG. 5(b).

The display module 151 may also be configured, without using the touch sensor, to be able to identify a fingerprint by using a scan structure of the photo sensor. In this case, the display module 151 may include a stack of the base layer, the LCD module, the photo sensor and the window.

Figure 6:
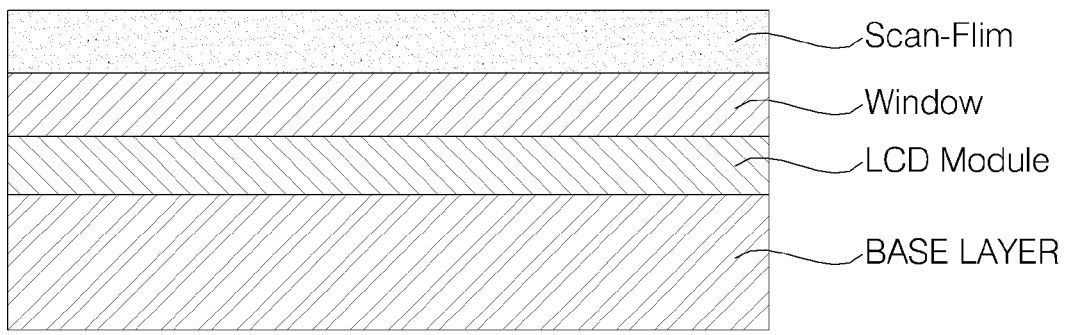
Figure 6:
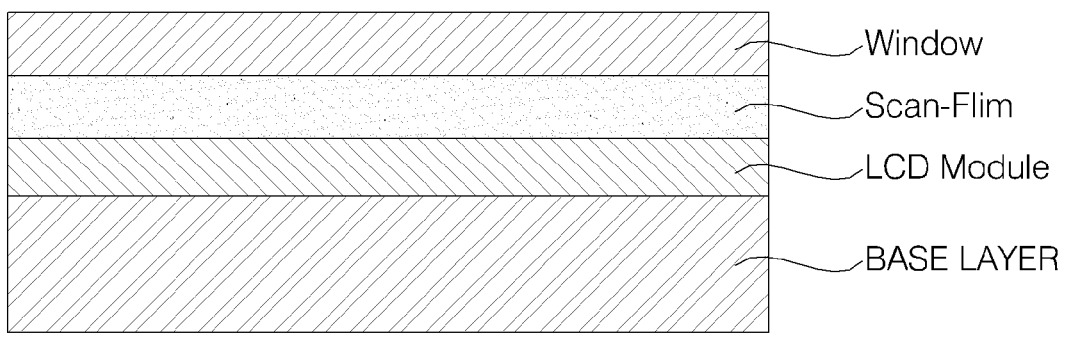
Figure 7:
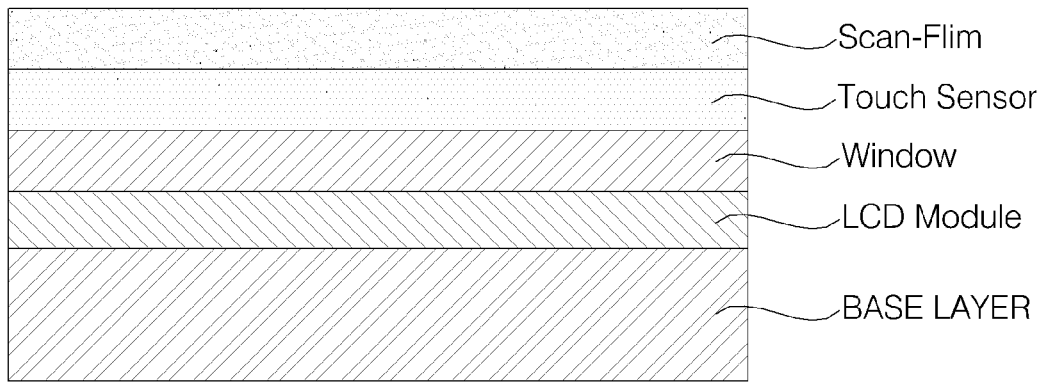
Figure 7:
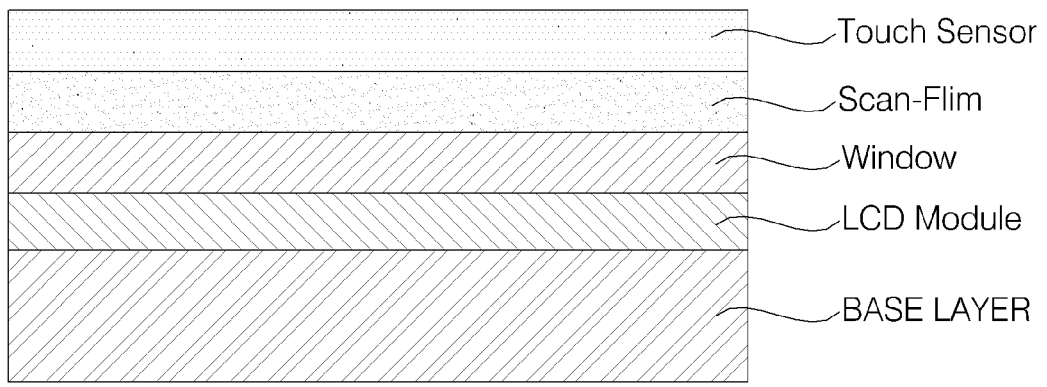
Figure 7:
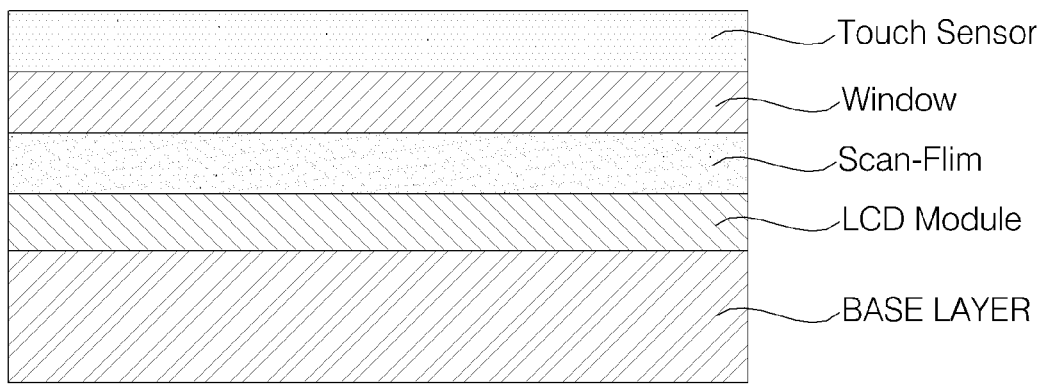

Alternatively, referring to FIGS. 6 and 7, the display module 151 may include an LCD module covered with a scan film having a photo sensor. More specifically, the display module 151 may include a stack of a base layer, an LCD module, a window and a transparent scan film, as shown in FIG. 6(a), or may include a stack of the base layer, the LCD module, the transparent scan film and the window, as shown in FIG. 6(b).

Referring to FIGS. 7(a) through 7(c), the display module 151 may include both a scan film and a touch sensor. More specifically, the display module 151 may include a stack of a base layer, an LCD module, a window, the touch sensor and the scan film, as shown in FIG. 7(a), may include a stack of the base layer, the LCD module, the window, the scan film and the touch sensor, as shown in FIG. 7(b), or may include a stack of the base layer, the LCD module, the scan film, the window, and the touch sensor, as shown in FIG. 7(c).

The touch sensor may be disposed at the top or bottom of the window. Thus, the display module 151 may have a structure in which the base layer, the LCD module, the touch sensor, the window and the scan film are sequentially deposited, a structure in which the base layer, the LCD module, the touch sensor, the photo sensor and the window are sequentially deposited, or a structure in which the base layer, the LCD module, the photo sensor, the touch sensor and the window are sequentially deposited.

Figure 8:
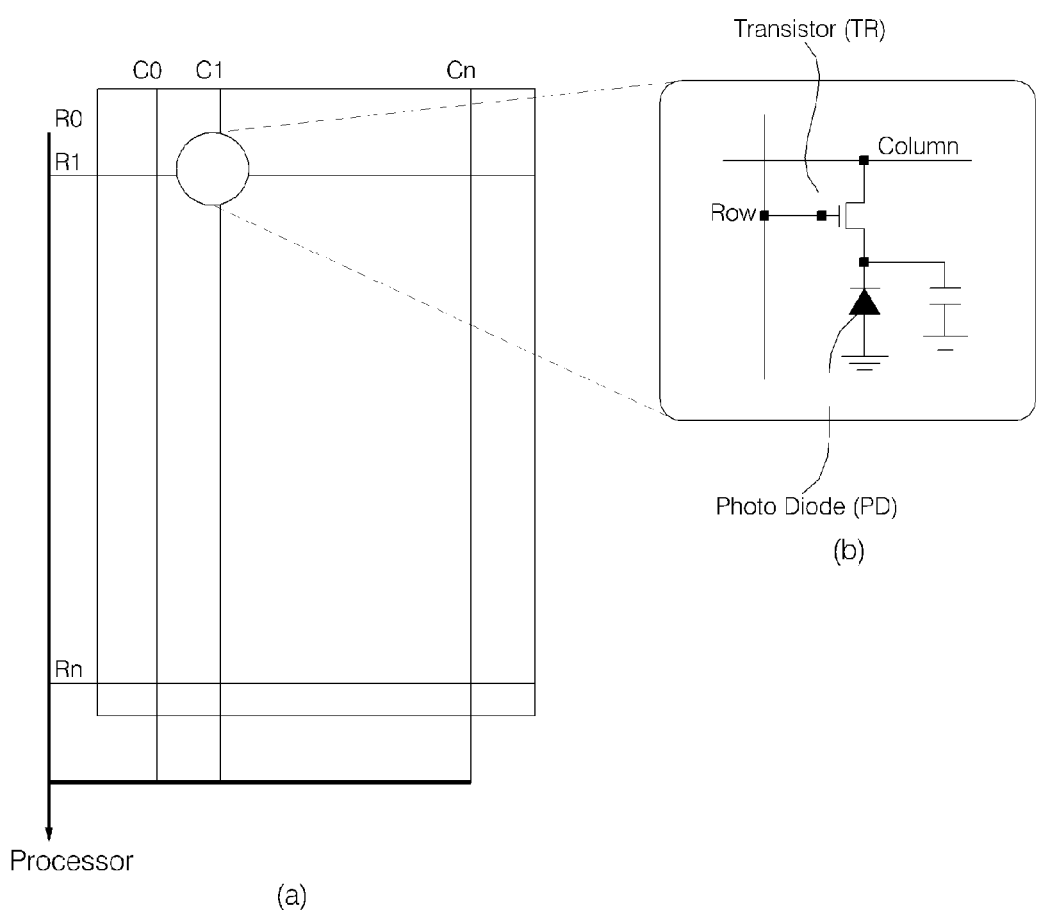

Referring to FIG. 8, a scan film may include a transparent film, which is formed of a transparent material such as glass, and a plurality of photodiodes PD and a plurality of transistors TR, which are mounted on the transparent film and are disposed at the intersections of a plurality of rows $R_0$ through $R_n$ and a plurality of columns $C_0$ through $C_n$ on the transparent film. Thus, the scan film may be able to scan any object placed thereon by using an electric signal whose level varies according to the amount of light applied to the photodiodes.

It is possible to perform a black-and-white scan operation including fingerprint identification by using a scan function of the scan film. In addition, it is possible to perform a color scan operation. In addition, it is possible to perform a color scan operation by combining light reflected from each pixel of the LCD module at the rear of the display module 151. In this case, the amount of red, green or blue light reflected from each pixel of the LCD module may be calculated using tables shown in FIG. 9, and red, green and blue light may be combined based on the results of the calculation. However, the present invention is not restricted to this. That is, various matrices or functions, other than the tables shown in FIG. 9, may be used to combine red, green and blue light.

Since the display module 151 can calculate coordinates based on a variation in the amount of light by using a photo sensor, the display module 151 not only can perform a scan operation but also can serve as an input device capable of receiving various types of touch inputs such as a single- or a multi-touch input.

As described above, the display module 151 may be able not only to perform a scan operation but also to receive various types of touch inputs by using a scan structure of a photo sensor without a requirement of a touch sensor. When no touch sensor is used in the display module 151, the manufacturing cost of the display module 151 can be reduced. On the other hand, when a touch sensor is used in the display module 151, the recognition of a touch input can be stabilized. The display module 151 has been described above as identifying a fingerprint using a touch sensor, but the present invention is not restricted to this. That is, the display module 151 may identify a fingerprint using various methods other than using a touch sensor. The user input unit 130 may be configured to have the above-mentioned structure of the display module 151 excluding an LCD module and thus to be able to identify a fingerprint.

Figure 10:
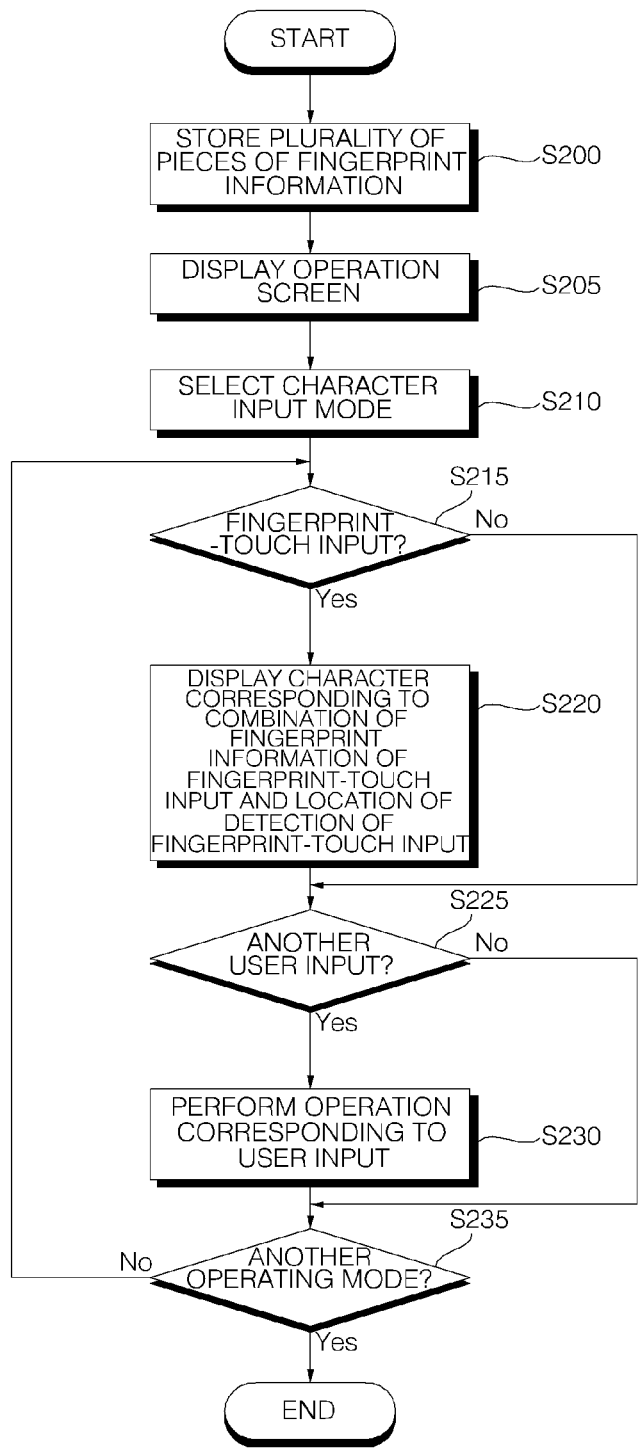
FIG. 10 illustrates a flowchart of a method of controlling a mobile terminal, according to an exemplary embodiment of the present invention.

FIG. 10 illustrates a flowchart of a method of controlling a mobile terminal, according to an exemplary embodiment of the present invention. Referring to FIG. 10, a plurality of pieces of fingerprint information obtained from different thumbs and fingers of a user or having different patterns may be stored in the memory 160 (S200). More specifically, different pieces of fingerprint information obtained from different thumbs and fingers of the user may be stored in the memory 160. Alternatively, give that pieces of fingerprint information obtained from the same thumb or finger of the user may differ from each other in terms of pattern, and particularly, the location of detection and the level of pressure, a plurality of pieces of fingerprint information having different patterns may be stored in the memory 160. Still alternatively, different pieces of fingerprint information obtained from different users may be stored in the memory 160.

The plurality of pieces of fingerprint information may be associated with and can thus be identified by different characters or symbols. For this, an additional menu may be provided.

Thereafter, the controller 180 may display an operation screen relevant to a current operating mode selected by the user on the display module 151 (S205). Examples of the operation screen include, but are not limited to, an idle screen, an incoming message screen, an outgoing message screen, a main menu screen, an image viewer screen, a broadcast screen, a map screen and a webpage screen.

Thereafter, if a character input mode during which the user can enter various characters or symbols, such as Korean, English or Chinese characters, numbers, or punctuation marks is selected (S210), the controller 180 may determine whether a fingerprint-touch input has been detected from the fourth user input module 130*d*, which is disposed on the second body 100B, and whether there is a match for fingerprint information of a fingerprint-touch input, if any, detected from the fourth user input module 130*d* (S215). The term 'fingerprint-touch input,' as used herein, indicates, but is not limited to, a touch input with fingerprint information.

Thereafter, if it is determined in operation S215 that a fingerprint-touch input has been detected from the fourth user input module 130*d*, and that there is a match for the fingerprint information of the fingerprint-touch input in the memory 160, the controller 180 may display a character corresponding to the combination of the location of the detection of the fingerprint-touch input and the fingerprint information that matches the fingerprint information of the fingerprint-touch input on the display module 151 (S220). In this manner, the user can enter different characters or symbols using different fingers of his or hers. The controller 180 may generate a haptic effect or output an alarm sound upon the display of the character on the display module 151, and the haptic effect or alarm sound may vary from one character to another character.

If it is determined in operation 5215 that there is no match for the fingerprint information of the fingerprint-touch input in the memory 160 or if the fingerprint-touch input is accompanied by another user input such as a typical touch input or a key input (S225), the controller 180 may control an operation corresponding to the user input to be performed (S230). In this manner, the user can perform an operation such as editing or saving the character displayed on the display module 151. If a communication event such as an incoming call or an incoming message occurs, the controller 180 may control an operation relevant to the communication event to be performed. Operations S215 through S230 may be repeatedly performed until the user chooses another operating mode (S235).

According to this exemplary embodiment, it is possible to enter different characters in response to different fingerprint-touch inputs having different fingerprint information.

In the meantime, the controller 180 may be configured to perform different control operations in response to different fingerprint-touch inputs entered through the user input unit 130. For example, if the user generates a fingerprint-touch input by fingerprint-touching a scroll key, a navigation key or a side key, a display screen may be scrolled or replaced with another display screen, and the speed at which the display screen is scrolled or replaced with another display screen may vary from one finger to another finger used to generate the fingerprint-touch input. For example, the display screen may be scrolled or replaced with another display screen at a lowest speed in response to a fingerprint-touch input generated by the thumb, at a median speed in response to a fingerprint-touch input generated by the middle finger, at a second highest speed in response to a fingerprint-touch input generated by the ring finger, and at a highest speed in response to a fingerprint-touch input generated by the little finger.

If the user generates a fingerprint-touch input by fingerprint-touching a fast forward (FF) key, a rewind (RR) key or a progress bar during the play of multimedia data, the multimedia data may be fast-forwarded or rewound, and the speed at which the multimedia data is fast-forwarded or rewound may vary from one finger to another finger used to generate the fingerprint-touch input. For example, if the slider in the progress bar is fingerprint-touched and then dragged with the index finger, the multimedia may be fast-forwarded or rewound at a low speed. On the other hand, if the slider in the progress bar is fingerprint-touched and then dragged with the ring finger, the multimedia may be fast-forwarded or rewound at a high speed.

The controller 180 may vary the speed of performing a control operation in response to a fingerprint-touch input according to the duration of the detection of the fingerprint touch input. That is, the speed at which the controller 180 performs a control operation in response to a fingerprint-touch input may be determined by the duration of the detection of the fingerprint-touch input. For example, if a scroll key is fingerprint-touched with the index finger, a display screen may be scrolled. In this case, the speed in which the display screen is scrolled may gradually increase according to the duration for which the scroll key is fingerprint-touched.

Fingerprint information of a fingerprint-touch input may be easily obtained from the location of the detection of the fingerprint-touch input. However, if the fingerprint-touch input is accompanied by a drag input, fingerprint information may be obtained once from the location of the detection of the fingerprint-touch input, and an operation corresponding to the drag input may be performed. Alternatively, fingerprint information may be obtained more than once from along the whole path of the drag input, which begins at the location of the detection of the fingerprint-touch input, and the operation corresponding to the drag input may be performed only if a number of pieces of fingerprint information obtained from along the path of the drag input all match with the fingerprint information detected from the location of the detection of the fingerprint-touch input. Still alternatively, fingerprint information may be obtained twice from the location of the detection of the fingerprint-touch input and from the end of the path of the drag input, and the operation corresponding to the drag input may be performed only if fingerprint information obtained from the end of the path of the drag input matches with the fingerprint information detected from the location of the detection of the fingerprint-touch input.

Figure 11:
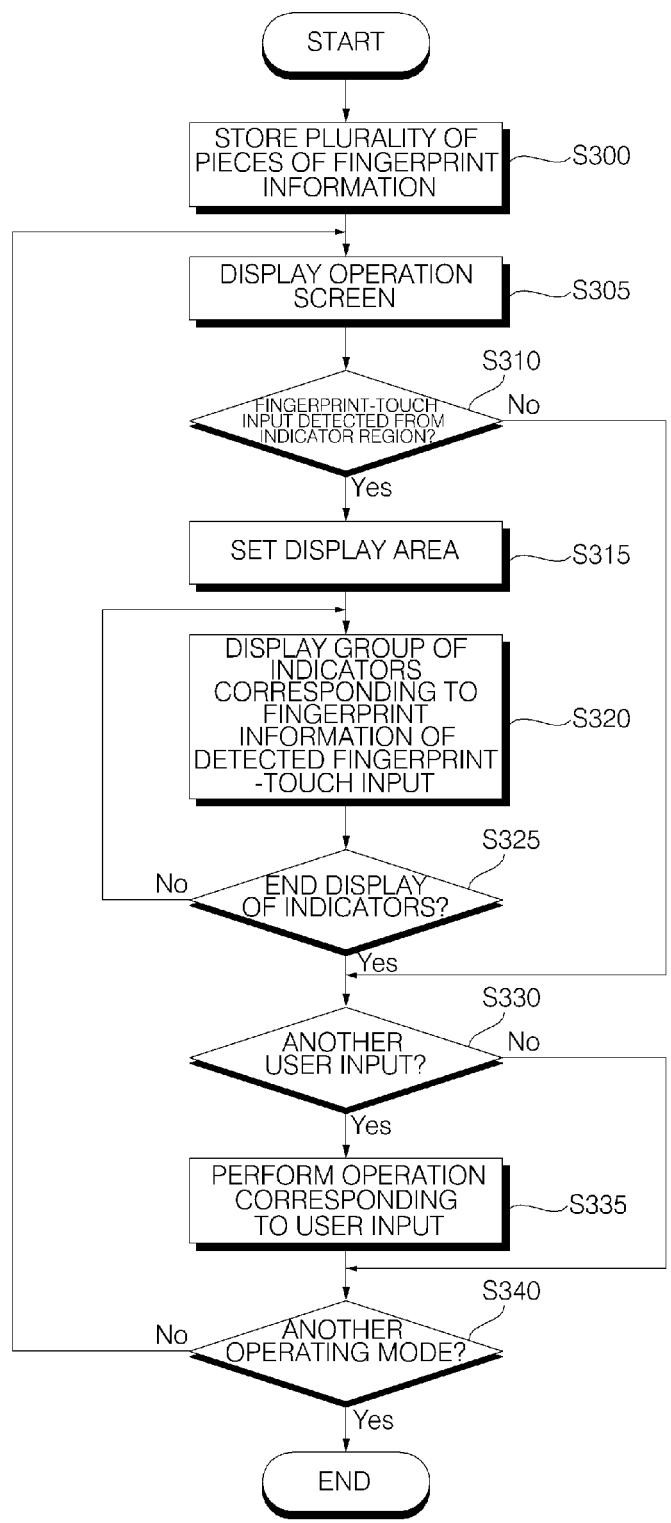
FIG. 11 illustrates a flowchart of a method of controlling a mobile terminal, according to another exemplary embodiment of the present invention.

FIG. 11 illustrates a flowchart of a method of controlling a mobile terminal, according to another exemplary embodiment of the present invention. Referring to FIG. 11, a plurality of pieces of fingerprint information obtained from different thumbs and fingers of a user or having different patterns may be stored in the memory 160 (S300). Each of the plurality of pieces of fingerprint information may be associated with an indicator group.

Thereafter, the controller 180 may display an operation screen relevant to a current operating menu selected by the user on the display module 151 (S305).

Thereafter, the controller 180 may determine whether a fingerprint-touch input has been detected from an indicator region in which a plurality of indicators are displayed and whether there is a match for fingerprint information of a fingerprint-touch input, if any, detected from the indicator region (S310). The term 'fingerprint-touch input,' as used herein, indicates, but is not limited to, a touch input with fingerprint information.

Thereafter, if it is determined in operation S310 that a fingerprint-touch input has been detected from the indicator region, and that there is a match for the fingerprint information of the fingerprint-touch input in the memory 160, the controller 180 may set a particular region on the display module 151 as a display area (S315), and may display a number of indicators included in an indicator group corresponding to the fingerprint information that matches the fingerprint information of the fingerprint-touch input in the display area. (S320). The controller 180 may also display additional information, if any, on the indicator group corresponding to the fingerprint information that matches the fingerprint information of the fingerprint-touch input in the display area.

Indicators that can be displayed in the indicator region may be classified into, for example, four groups, i.e., first through fourth indicator groups.

The first indicator group may include a number of indicators related to the state of the connection of the mobile terminal 100 to a network, such as a 'service mode & signal strength' indicator, a 'roaming' indicator, a call indicator, a 'data session' indicator, a GPS indicator, a 'voice privacy' indicator, and a secure socket layer (SSL) indicator.

The second indicator group may include a number of indicators related to the state of the connection of the mobile terminal 100 to an external device, such as a Bluetooth indicator and a WiFi indicator.

The third indicator group may include a number of indicators related to the operating state of the mobile terminal 100 such as an 'airplane mode' indicator, a 'music-only mode, master volume' indicator, a battery level indicator, a touch lock indicator, and an FM radio indicator.

The fourth indicator group may include a number of indicators for alerting the user to the occurrence of an event such as a 'new message' indicator, a 'new voicemail' indicator, an 'alarm settings' indicator, and a 'missed call' indicator.

The display area may be set on the display module 151 in various manners. For example, the whole display module 151 or only a portion of the display module 151 such as at the top or bottom or on either side of the display module 151 may be set as the display area. If the indicator region is fingerprint-touched and then dragged, a display area having a size corresponding to the distance by which the indicator region is dragged may be provided below the indicator region.

If the display of indicators is chosen to be ended (S325), the method proceeds to operation (S330). On the other hand, if the display of indicators is chosen to be continued, the method returns to operation (S320).

If it is determined in operation (S310) that there is no match for the fingerprint information of the fingerprint-touch input in the memory 160 or if the fingerprint-touch input is accompanied by another user input such as a typical touch input or a key input (S330), the controller 180 may control an operation corresponding to the user input to be performed (S335). In this case, if a communication event such as an incoming call or an incoming message occurs, the controller 180 may control an operation relevant to the communication event to be performed.

Operations S305 through S335 may be repeatedly performed until the user chooses another operating mode (S340).

According to this exemplary embodiment, it is possible to display different groups of indicators and additional information thereof in response to different fingerprint-touch inputs having different fingerprint information.

The exemplary embodiments of FIGS. 10 and 11 will hereinafter be described in further detail with reference to FIGS. 12 through 14.

Figure 12:
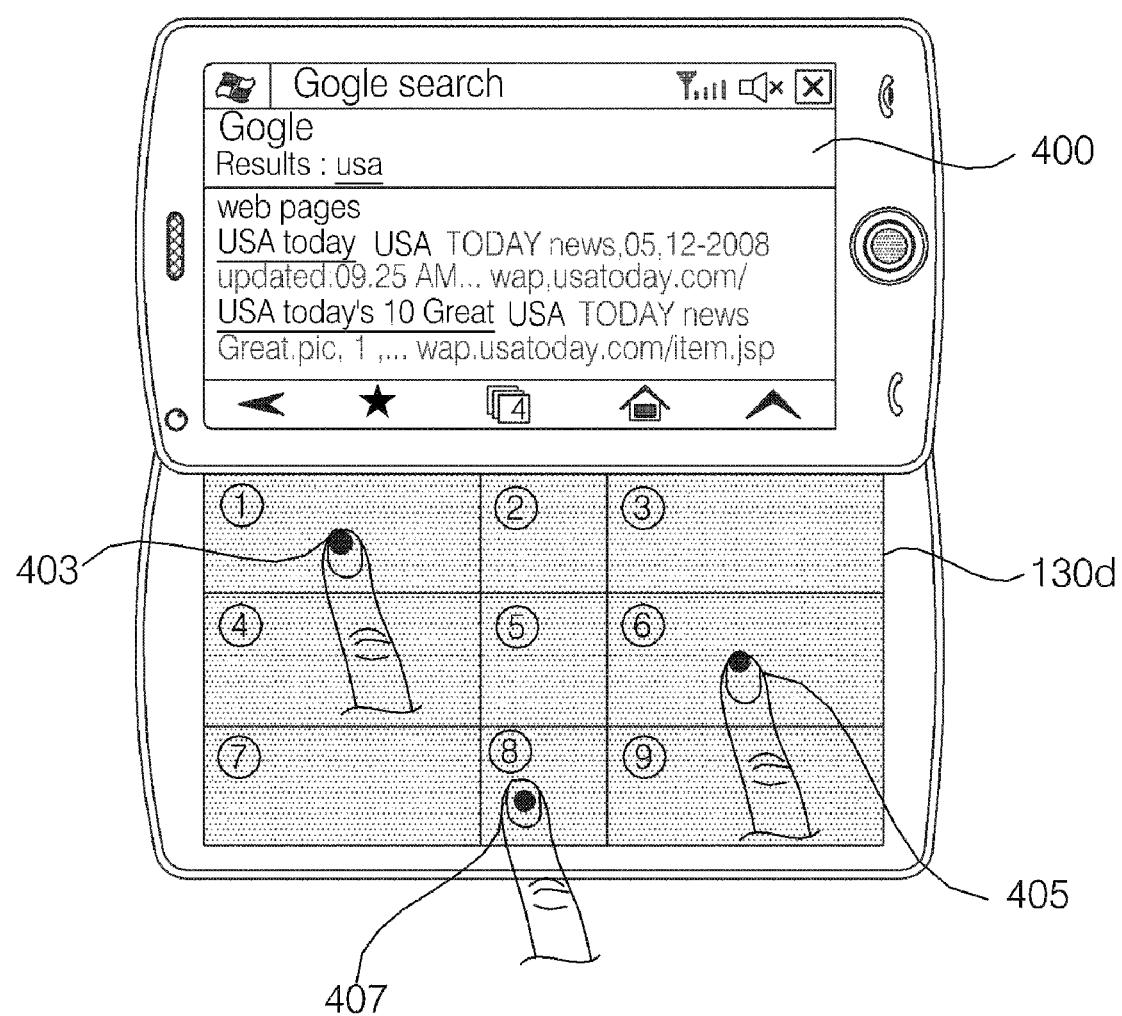
FIG. 12 illustrates a diagram for explaining an example of how to enter different characters using different fingerprint-touch inputs having different fingerprint information.

FIG. 12 illustrates a diagram for explaining how to enter different characters using different fingerprint-touch inputs having different fingerprint information. Referring to FIG. 12, the fourth user input module 130d may be divided into a plurality of first through ninth areas ① through ⑨. Each of the first through ninth areas ① through ⑨ may return different characters in response to different fingerprint-touch inputs having different fingerprint information. For example, in an English input mode, if the first area ① is fingerprint-touched with the index finger of the left hand, as indicated by reference numeral 403, the English letter R may be entered. If the first area ① is fingerprint-touched with the middle finger of the left hand, the English letter E may be entered. If the first area ① is fingerprint-touched with the ring finger of the left hand, the English letter W may be entered. If the first area ① is fingerprint-touched with the little finger of the left hand, the English letter Q may be entered. The English letter entered by fingerprint-touching the first area ① may be displayed on an operation screen 400.

In the English input mode, if the sixth area ⑥ is fingerprint-touched with the index finger of the left hand, as indicated by reference numeral 405, the English letter J may be entered. If the sixth area ⑥ is fingerprint-touched with the middle finger of the left hand, the English letter K may be entered. If the sixth area ⑥ is fingerprint-touched with the little finger of the left hand, the English letter L may be entered.

In the English input mode, if the eighth area ⑧ is fingerprint-touched with the index finger of the right hand, as indicated by reference numeral 407, the English letter N may be entered. On the other hand, if the eighth area ⑧ is fingerprint-touched with the index finger of the left hand, the English letter B may be entered.

In this manner, even if the fourth user input module 130 is not equipped with a whole keypad, it is possible to enter various characters or symbols as if using a QWERTY keypad and to reduce the probability of a failure in the recognition of characters. In addition, it is possible to improve security by allowing only individuals whose fingerprints are already registered in the mobile terminal 100 to enter characters or symbols to the mobile terminal 100.

Figure 13:
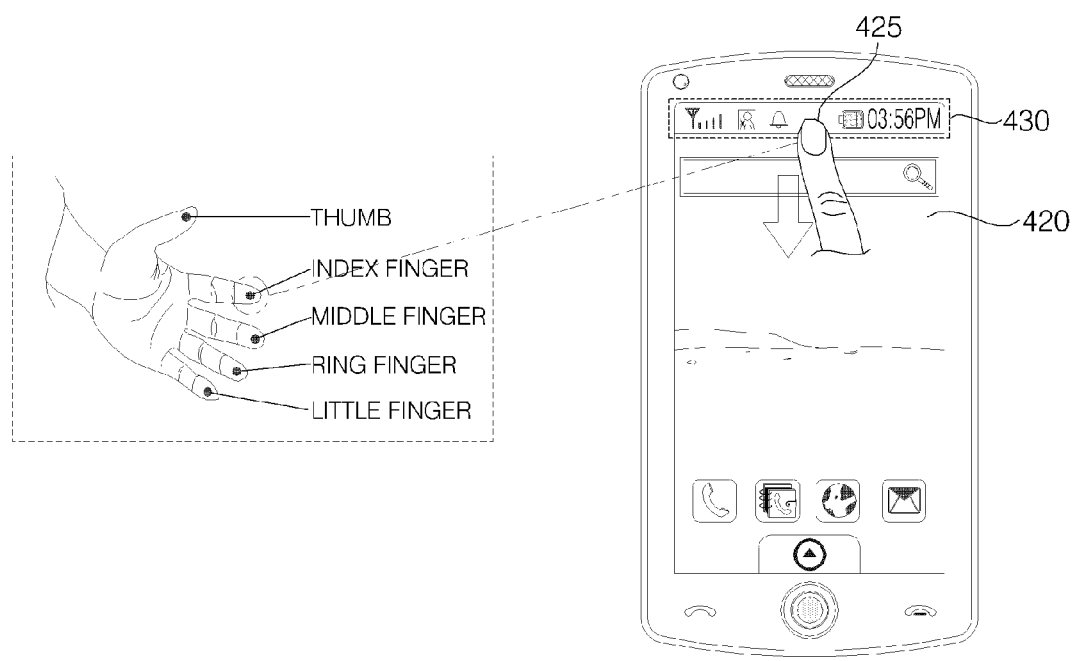
FIGS. 13 and 14 illustrate diagrams for explaining an example of how to display different groups of indicators in response to different fingerprint-touch inputs having different fingerprint information.
Figure 14:
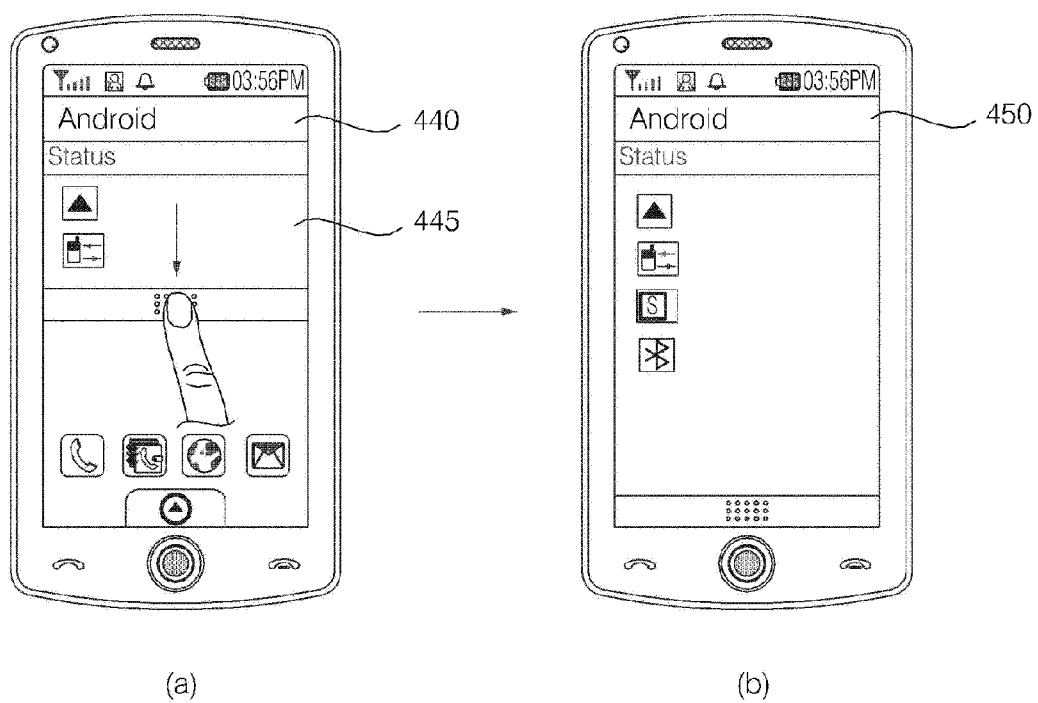

FIGS. 13 and 14 illustrate diagrams for explaining an example of how to display different groups of indicators in response to different fingerprint-touch inputs having different fingerprint information. Referring to FIG. 13, an indicator region 430, in which only a limited number of indicators can be displayed, may be provided at the top of an operation screen 420. If the indicator region 430 is fingerprint-touched, as indicated by reference numeral 425, one of various groups of indicators and additional information thereof may be displayed in the indicator region 430 according to which finger was used to fingerprint-touch the indicator region 430.

Referring to FIGS. 14(*a*) and 14(*b*), if an indicator region at the top of an operation screen 440 is fingerprint-touched and then dragged down on the operation screen 440, a display area 445 having a size corresponding to the distance by which the indicator region is dragged down on the operation screen 440 may be provided below the indicator region, and a group of indicators corresponding to fingerprint information of the finger (e.g., the index finger) used to fingerprint-touch the indicator region may be displayed in the display area 445. As a result, an operation screen 450 may be displayed on the display module 151.

For example, if the indicator region is fingerprint-touched with the index finger, a group of indicators related to the state of the connection of the mobile terminal 100 to a network may be displayed in the display area 445. If the indicator region is fingerprint-touched with the middle finger, a group of indicators related to the state of the connection of the mobile terminal 100 to an external device may be displayed in the display area 445. If the indicator region is fingerprint-touched with the ring finger, a group of indicators for alerting a user to the occurrence of an event may be displayed in the display area 445.

When the group of indicators corresponding to the fingerprint information of the finger used to fingerprint-touch the indicator region is displayed in the display area 445, a particular screen effect, sound effect or haptic effect may be generated.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, a plurality of pieces of fingerprint information obtained from different fingers of an individual or from different individuals or having different patterns may be stored in advance in a mobile terminal, and thus, different characters or symbols may be entered to the mobile terminal using the combinations of different fingerprint-touch inputs having different fingerprint information and the locations of the detection of the different fingerprint-touch inputs. In addition, it is possible to display different groups of indicators in response to different fingerprint-touch inputs having different fingerprint information. Moreover, it is possible to effectively control various operations performed by a mobile terminal using any combination of a fingerprint-touch input, a typical key input and a typical touch input.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    displaying an operation screen on a display module of the mobile terminal;
    receiving a fingerprint-touch input through a user input unit of the mobile terminal, the user input unit being configured to identify a fingerprint, the user input unit including first keys for entering a character and second keys for entering different control commands;
    if fingerprint information of a fingerprint-touch input received through one of the first keys corresponds to a first of a plurality of previously-stored fingerprint information, displaying on the operation screen a character corresponding to a combination of a detected location of the fingerprint-touch input received through one of the first keys and the first of the plurality of previously-stored fingerprint information; and
    if fingerprint information of a fingerprint-touch input received through one of the second keys corresponds to a second of the plurality of previously-stored fingerprint information, performing a control operation at a first predefined speed and if the fingerprint information of the fingerprint-touch input received through said one of the second keys corresponds to a third of the plurality of previously-stored fingerprint information, performing the control operation at a second predefined speed different than the first predefined speed.

2. The method of claim 1, wherein the plurality of previously-stored fingerprint information is stored in a memory of the mobile terminal on at least one of a finger-by-finger basis, a user-by-user basis, and a pattern-by-pattern basis.

3. The method of claim 1, further comprising:
    generating, by the mobile terminal, a haptic effect corresponding to the displayed character.

4. The method of claim 1, further comprising:
    displaying on the operation screen a menu for associating combinations of each of the plurality of previously-stored fingerprint information and different parts on the user input unit with different characters or symbols.

5. The method of claim 1, further comprising:
    if none of the plurality of previously-stored fingerprint information match the fingerprint information of the received fingerprint-touch input, performing an operation corresponding to the detected location of the received fingerprint-touch input.

6. A mobile terminal, comprising:
    a display module configured to display an operation screen thereon;
    a user input unit configured to identify a fingerprint, the user input unit including first keys for entering a character and second keys for entering different control commands;

a memory configured to store a plurality of fingerprint information therein; and a controller configured to:

receive a fingerprint-touch input through the user input unit, if fingerprint information of fingerprint-touch input received through one of the first keys corresponds to a first of the previously stored plurality of fingerprint information, display on the operation screen a character corresponding to a combination of a detected location of the fingerprint-touch input received through one of the first keys and the first of the stored plurality of fingerprint information, and if fingerprint information of fingerprint-touch input received through one of the second keys corresponds to second of the plurality of previously-stored fingerprint information, perform a control operation at a first predefined speed corresponding to the fingerprint-touch input received through one of the second keys and if the fingerprint information of the fingerprint-touch input received through said one of the second keys corresponds to a third of the plurality of previously-stored fingerprint information, perform the control operation at a second predefined speed different than the first predefined speed.

7. The mobile terminal of claim 6, wherein the memory stores the plurality of fingerprint information on at least one of a finger-by-finger basis, a user-by-user basis, and a pattern-by-pattern basis.

8. The mobile terminal of claim 6, wherein the display module is disposed on a first body of the mobile terminal and the user input unit is disposed on a second body of the mobile terminal, the second body being slidably coupled to the first body.

9. A method of controlling a mobile terminal, the method comprising:

displaying an operation screen on a display module of the mobile terminal, the operation screen including an indicator region for displaying a number of indicators corresponding to a state of the mobile terminal, the display module configured to identify a fingerprint, the number of indicators being classified into a predefined number of indicator groups according to a user command;

detecting, by the display module, a fingerprint-touch input to the indicator region; and if fingerprint information of the detected fingerprint-touch input corresponds to a first one of a plurality of previously-stored fingerprint information, displaying in a display area on the operation screen a first indicator group including at least one indicator corresponding to the first one of the plurality of previously-stored fingerprint information, and if the fingerprint information of the detected fingerprint-touch input corresponds to a second one of the plurality of previously-stored fingerprint information, displaying in the display area a second indicator group including at least one indicator corresponding to the second one of the plurality of previously-stored fingerprint information, wherein the second indicator group includes different indicators than the first indicator group.

10. The method of claim 9, wherein the plurality of previously-stored fingerprint information are stored in a memory of the mobile terminal on at least one of a finger-by-finger basis, a user-by-user basis, and a pattern-by-pattern basis.

11. The method of claim 9, further comprising:

setting, by the mobile terminal, the display area below the indicator region in response to a drag input followed by the detected fingerprint-touch input, the display area having a size corresponding to a distance of the drag input.

12. The method of claim 9, further comprising:

setting, by the mobile terminal, the display area on one side of the operation screen.

13. The method of claim 9, further comprising:

displaying additional information on the displayed at least one indicator.

14. The method of claim 9, further comprising:

removing, by the mobile terminal, the display area from the operation screen in response to a touch input detected in the display area.

15. The method of claim 9, further comprising:

generating, by the mobile terminal, a haptic effect in connection with the displaying of the at least one indicator belonging to the predefined indicator group.

16. The method of claim 9, wherein the predefined number of indicator groups comprise at least one of the following:

an indicator group related to a state of a connection of the mobile terminal to a network;

an indicator group related to a state of a connection of the mobile terminal to an external device;

an indicator group related to an operating state of the mobile terminal; and an indicator group for alerting a user to an occurrence of an event.

17. A mobile terminal, comprising:

a display module configured to identify a fingerprint and display an operation screen including an indicator region for displaying a number of indicators corresponding to a state of the mobile terminal, the number of indicators being classified into a predefined number of indicator groups according to a user command;

a memory configured to store a plurality of fingerprint information therein; and a controller configured to:

detect a fingerprint-touch input to the indicator region, and if fingerprint information of the detected fingerprint-touch input corresponds to one of the plurality of previously-stored fingerprint information, display in a display area on the operation screen a first indicator group including at least one indicator corresponding to the first one of the plurality of previously-stored fingerprint information, and if the fingerprint information of the detected fingerprint-touch input corresponds to a second one of the plurality of previously-stored fingerprint information, display in the display area a second indicator group including at least one indicator corresponding to the second one of the plurality of previously-stored fingerprint information, wherein the second indicator group includes different indicators than the first indicator group.

18. The mobile terminal of claim 17, wherein the memory stores the plurality of previously-stored fingerprint information on at least one of a finger-by-finger basis, a user-by-user basis, and a pattern-by-pattern basis.

19. The mobile terminal of claim 17, wherein the controller is further configured to remove the display area from the operation screen in response to a touch input detected from the display area.

20. The mobile terminal of claim 17, wherein the predefined number of indicator groups comprise at least one of the following:

an indicator group related to a state of a connection of the mobile terminal to a network;

an indicator group related to a state of a connection of the mobile terminal to an external device;
an indicator group related to an operating state of the mobile terminal; and
an indicator group for alerting a user to an occurrence of an event.

* * * * *